(12) United States Patent
Tanno et al.

(10) Patent No.: US 8,605,663 B2
(45) Date of Patent: Dec. 10, 2013

(54) BASE STATION, MOBILE STATION, AND COMMUNICATION METHOD

(75) Inventors: Motohiro Tanno, Yokohama (JP);
Kenichi Higuchi, Yokohama (JP);
Mamoru Sawahashi, Yokohama (JP);
Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 704 days.

(21) Appl. No.: 12/304,273

(22) PCT Filed: Jun. 13, 2007

(86) PCT No.: PCT/JP2007/061934
§ 371 (c)(1),
(2), (4) Date: Mar. 5, 2009

(87) PCT Pub. No.: WO2007/148585
PCT Pub. Date: Dec. 27, 2007

(65) Prior Publication Data
US 2009/0190539 A1   Jul. 30, 2009

(30) Foreign Application Priority Data

Jun. 19, 2006 (JP) .................................. 2006-169444

(51) Int. Cl.
*H04W 4/00* (2009.01)

(52) U.S. Cl.
USPC ............................ 370/329; 370/328; 370/330

(58) Field of Classification Search
USPC ........................................................ 370/329
See application file for complete search history.

(56) References Cited

U.S. PATENT DOCUMENTS

| 6,608,824 | B1 | 8/2003 | Sugaya | |
| 6,904,265 | B1* | 6/2005 | Valdivia et al. | 455/12.1 |
| 2003/0065823 | A1* | 4/2003 | Kim | 709/250 |

FOREIGN PATENT DOCUMENTS

| JP | 2000-151641 A | 5/2000 |
| WO | 2005062855 A2 | 7/2005 |

OTHER PUBLICATIONS

Mexican Office Action for Application No. MX/a/2008/015916, mailed on Jul. 16, 2010 (4 pages).
International Search Report w/translation from PCT/JP2007/061934 dated Aug. 14, 2007 (3 pages).
Written Opinion from PCT/JP2007/061934 dated Aug. 14, 2007 (3 pages).
3GPP TSG RAN WG1 #44 Meeting; R1-060288; Denver, USA, Feb. 13-17, 2006 (5 pages).
Chow, Peter S. et al.; "A Practical Discrete Multitone Transceiver Loading Algorithm for Data Transmission over Spectrally Shapped Channels"; IEEE Transactions Communications; vol. 43, No. 2/3/4; Feb./Mar./Apr. 1995; pp. 773-775 (3 pages).
Japanese Office Action for Application No. 2009-191400, mailed on Jun. 21, 2011 (6 pages).

* cited by examiner

*Primary Examiner* — Shripal Khajuria
(74) *Attorney, Agent, or Firm* — Osha Liang LLP

(57) ABSTRACT

A base station for transmitting a radio frame where an L1/L2 control channel is multiplexed into a portion of a subframe to transmit data on a shared data channel includes a broadcast channel generating unit configured to generate a broadcast channel; an L1/L2 control channel generating unit configured to generate the L1/L2 control channel corresponding to the broadcast channel, which includes at least one broadcast channel control information from the group consisting of: an update flag indicating whether information on the broadcast channel is modified, broadcast channel allocation information, and L3 control information for the broadcast channel; and a multiplexing unit configured to multiplex the broadcast channel, the shared data channel, and the L1/L2 control channel into the subframe.

6 Claims, 9 Drawing Sheets

FIG.1
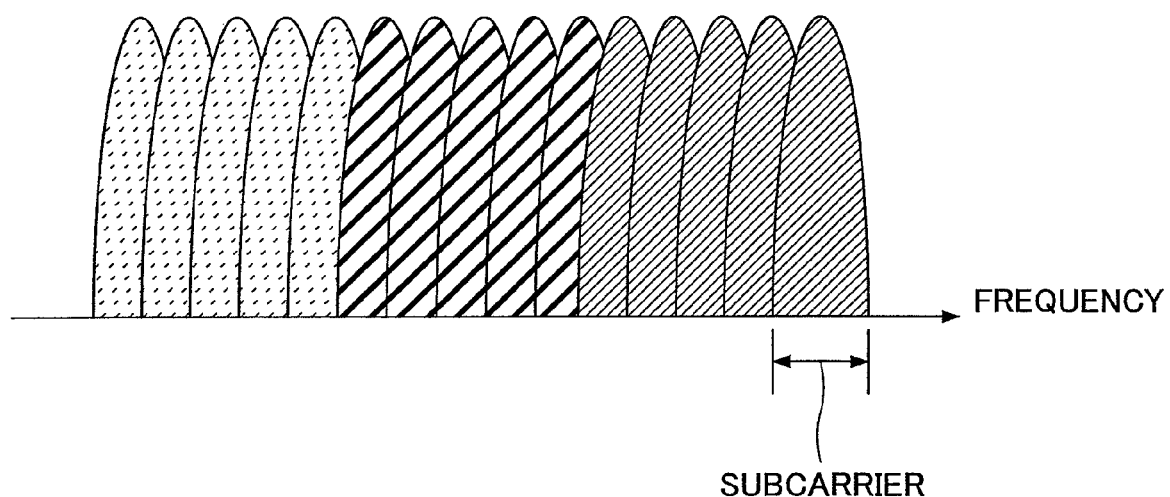
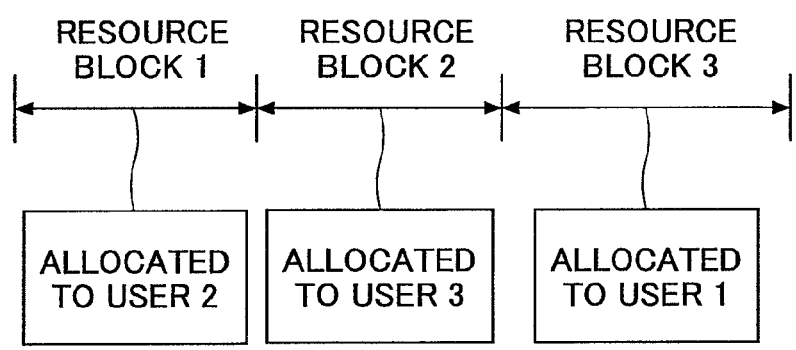

BASE STATION, MOBILE STATION, AND COMMUNICATION METHOD

BACKGROUND OF THE INVENTION

1. Field of the Invention

The present invention relates to a technical field of radio communications. More specifically, the present invention relates to a base station, a mobile station, and a communication method used for a communication system in which multicarrier transmission is performed.

2. Description of the Related Art

In this technical field, it is becoming more and more important to realize wideband radio access for efficiently performing high speed and large capacity communications. As for downlink channels, a multicarrier scheme, more specifically an Orthogonal Frequency Division Multiplexing (OFDM) scheme, is considered promising from the viewpoint of performing high speed and large capacity communications while effectively suppressing multipath fading.

As shown in FIG. 1, a frequency bandwidth used in the system is divided into multiple resource blocks (divided into three resource blocks in FIG. 1), and each of the resource blocks includes one or more subcarriers. The resource block is also referred to as a frequency chunk or a frequency block. One or more resource blocks are allocated to a mobile station. The technology for dividing a frequency band into multiple resource blocks is described in P. Chow, J. Cioffi, J. Bingham, "A Practical Discrete Multitone Transceiver Loading Algorithm for Data Transmission over Spectrally Shaped Channel", IEEE Trans. Commun. vol. 43, No. 2/3/4, February/March/April 1995, for example.

SUMMARY OF THE INVENTION

Problem(s) to be Solved by the Invention

The case where a frequency band is divided into multiple resource blocks is discussed below. As shown in FIG. 2, when data are transmitted on a shared data channel, an L1/L2 (Layer 1/Layer 2) control channel is multiplexed into a portion of a subframe. When data are transmitted on the shared data channel, the following information is transmitted on the L1/L2 control channel.

shared control information: transmission allocation information (information about a destination (mobile station) to which data are transmitted; information about radio resources for the shared data channel on which data are transmitted)

dedicated control information: information about a modulation scheme and a coding rate used for the shared data channel; control information used for H-ARQ (Hybrid Automatic Repeat Request); etc.

On the other hand, a broadcast channel (BCH) is a common control channel received by all mobile stations (UE: User Equipment) including idle mobile stations. The broadcast channel is typically transmitted with fixed radio resources (resource blocks) and a fixed modulation scheme and a fixed coding rate. In addition, H-ARQ is not used for the broadcast channel.

As shown in FIG. 3, when the broadcast channel is conventionally placed on resource blocks used for the shared data channel, there is a problem in that the L1/L2 control channel corresponding to the broadcast channel is wasted in the subframe. As shown in FIG. 2, for example, when all of eight resource blocks are used for the shared data channel, the L1/L2 control channel is used for transmitting control information for the shared data channel with these eight resource blocks. Accordingly, the L1/L2 control channel is not wasted. On the contrary, as shown in FIG. 3, three resource blocks among the eight resource blocks are used for the broadcast channel, three-eighths of the resource blocks used for the L1/L2 control channel are wasted.

In view of the aforementioned problem, it is a general object of the present invention to efficiently use a control channel when resource blocks are allocated to a broadcast channel.

Means for Solving the Problem

In one aspect of the present invention, there is provided a base station for transmitting a radio frame where an L1/L2 control channel is multiplexed into a portion of a subframe to transmit data on a shared data channel, including:

a broadcast channel generating unit configured to generate a broadcast channel;

an L1/L2 control channel generating unit configured to generate the L1/L2 control channel corresponding to the broadcast channel, which includes at least one broadcast channel control information from the group consisting of:

an update flag indicating whether information on the broadcast channel is modified, broadcast channel allocation information, and L3 control information for the broadcast channel; and a multiplexing unit configured to multiplex the broadcast channel, the shared data channel, and the L1/L2 control channel into the subframe.

In another aspect of the present invention, there is provided a mobile station for receiving a radio frame where an L1/L2 control channel is multiplexed into a portion of a subframe to receive data on a shared data channel, including:

a demultiplexing unit configured to demultiplex the radio frame into the L1/L2 control channel, the shared data channel, and a broadcast channel;

an L1/L2 control channel processing unit configured to check whether information on the broadcast channel is modified by referring to the L1/L2 control channel; and a broadcast channel processing unit configured to process the broadcast channel, if the information on the broadcast channel is modified.

In another aspect of the present invention, there is provided a communication method in which a base station transmits a radio frame where an L1/L2 control channel is multiplexed into a portion of a subframe to transmit data on a shared data channel; including the steps of:

generating a broadcast channel;

generating the L1/L2 control channel corresponding to the broadcast channel, which includes at least one broadcast channel control information from the group consisting of:

an update flag indicating whether information on the broadcast channel is modified, broadcast channel allocation information, and L3 control information for the broadcast channel; and multiplexing the broadcast channel and the L1/L2 control channel into the subframe.

Effect of the Invention

According to an embodiment of the present invention, a control channel can be efficiently used when resource blocks are allocated to a broadcast channel.

BRIEF DESCRIPTION OF THE DRAWINGS

FIG. 1 shows an example of dividing a frequency bandwidth into multiple resource blocks.

DESCRIPTION OF THE PREFERRED EMBODIMENTS

Figure 2:
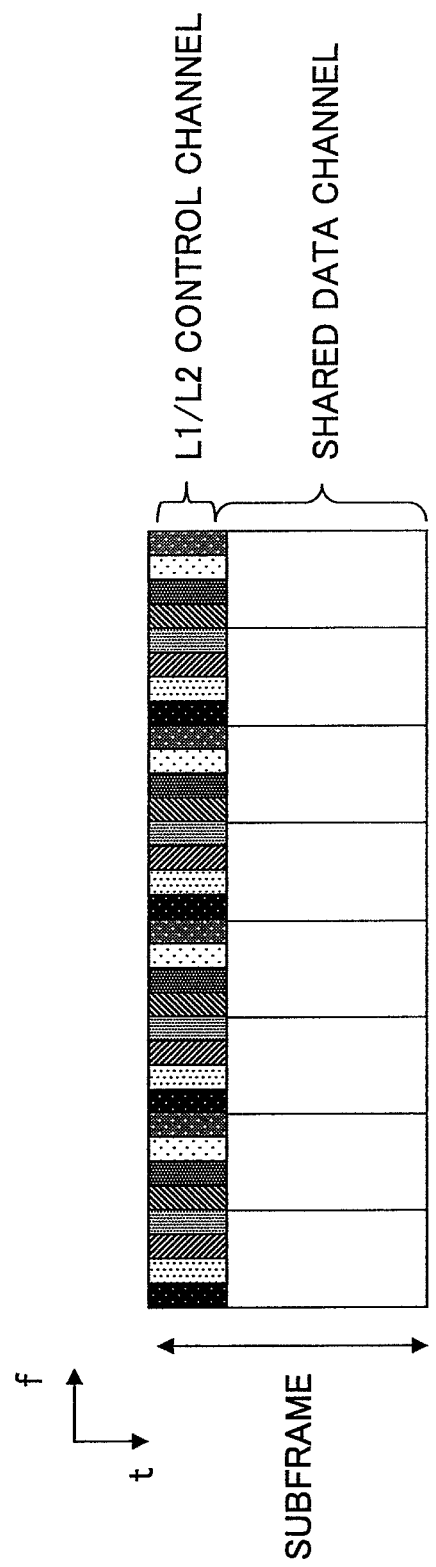
FIG. 2 shows a diagram where a shared data channel and an L1/L2 control channel are multiplexed into a subframe.

Description of Notations 10 base station
101 broadcast channel generating unit
103 L1/L2 control channel generating unit
105 shared data channel generating unit
107 mapping unit
109 multiplexing unit
111 transmission unit
20 mobile station
201 reception unit
203 demultiplexing unit
205 L1/L2 control channel processing unit
207 shared data channel processing unit
209 broadcast channel processing unit

BEST MODE OF CARRYING OUT THE INVENTION

With reference to the accompanying drawings, a description is given below with regard to preferred embodiments of the present invention.

Figure 3:
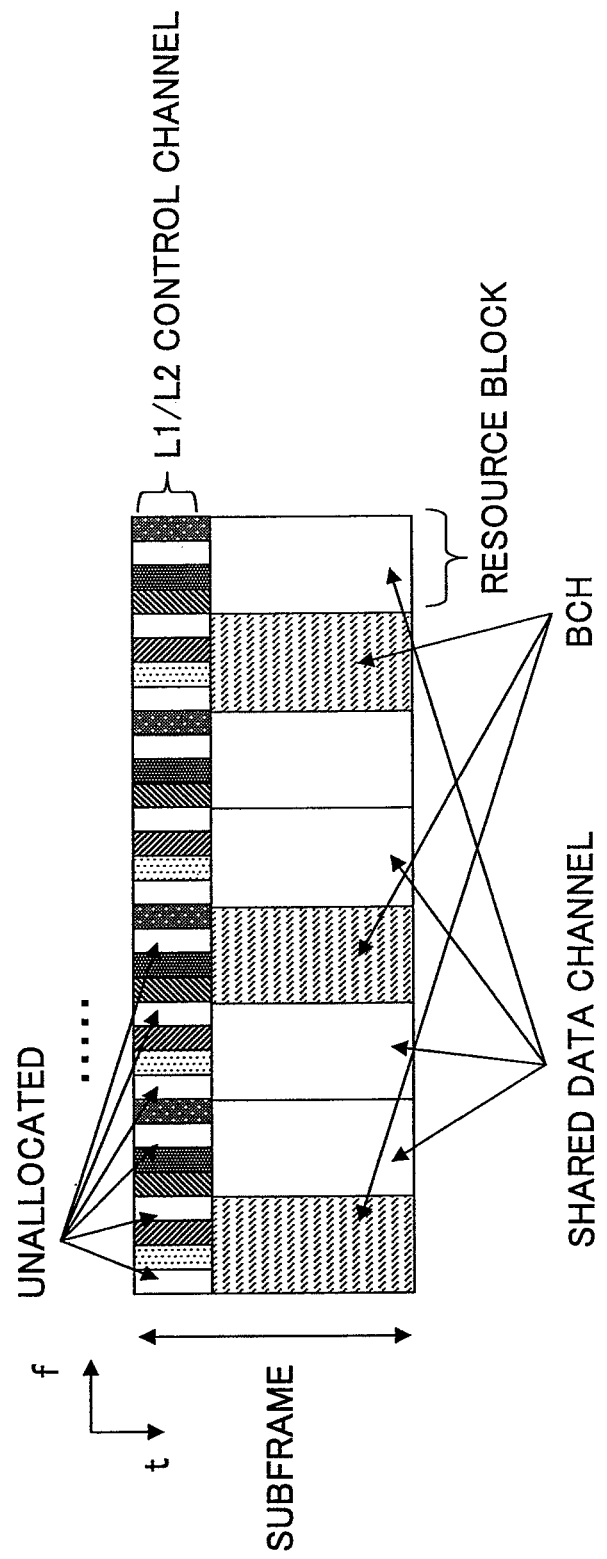
FIG. 3 shows a diagram where a broadcast channel, a shared data channel, and an L1/L2 control channel are multiplexed into a subframe.
Figure 4:
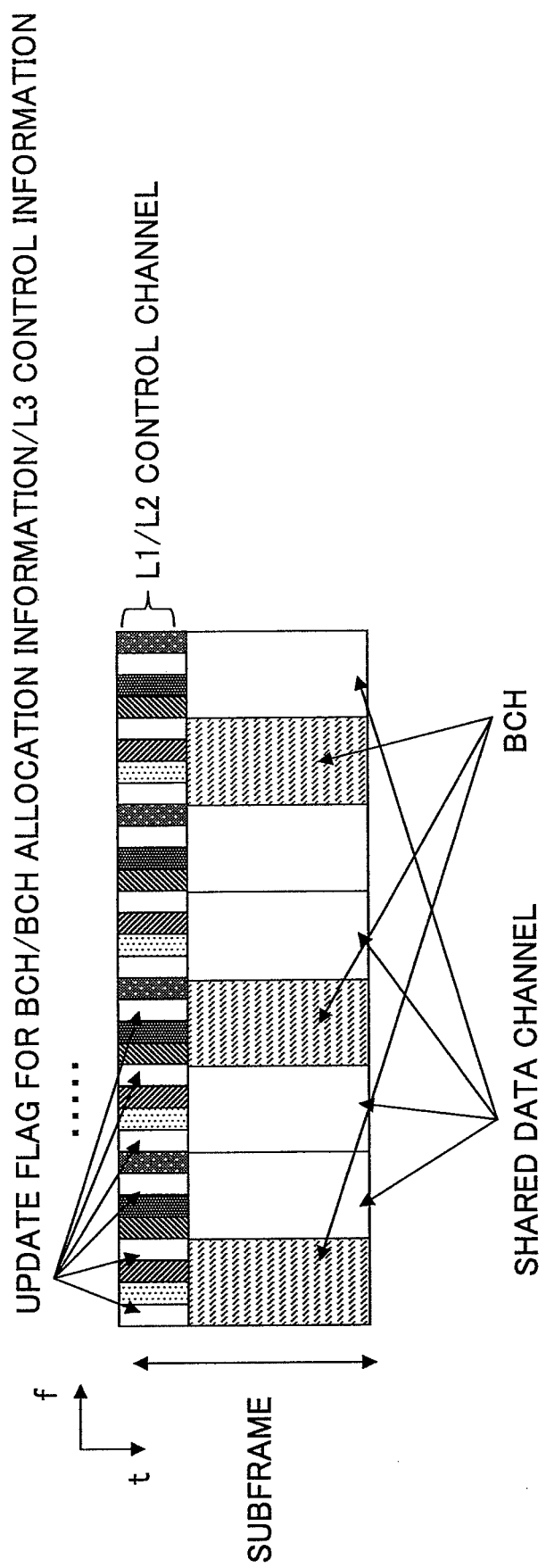
FIG. 4 shows broadcast channel control information included in the L1/L2 control channel in the subframe shown in FIG. 3.

As shown in FIG. 3, the maximum number of users (mobile stations) placed on a shared data channel in the case where a BCH is multiplexed into a subframe is smaller than the maximum number of users in the case where the BCH is not multiplexed into the subframe. In other words, regarding the subframe including the BCH, smaller radio resources are available for the shared data channel. Accordingly, it is necessary to decrease the maximum number of users placed on the subframe and to prevent available radio resources per user in the subframe including the BCH from becoming smaller than available radio resources in other subframes. At the same time, the maximum number of users placed on an L1/L2 control channel becomes smaller and the corresponding radio resources on the L1/L2 control channels are unallocated. With reference to FIG. 4, an approach is described below for transmitting BCH control information on the L1/L2 control channel corresponding to the BCH resource blocks and reducing waste on the L1/L2 control channel.

The following information is transmitted as BCH control information on the L1/L2 control channel.

(1) Update flag indicating whether information on the BCH is modified

Information transmitted on the BCH may not be frequently modified. If information on the BCH is not modified, the mobile station need not process the information on the BCH whenever the mobile station receives information on the BCH. Accordingly, an update flag indicating whether information on the BCH is modified is transmitted on the L1/L2 control channel corresponding to the BCH.

For example, the base station uses a modulo-N counter as the update flag and increments the counter when BCH information is updated. The mobile station can recognize whether the BCH information is updated by merely referring to the counter.

(2) Allocation information indicating radio resources for the BCH in the case where resource blocks are not statically allocated but dynamically allocated to the BCH (part of information transmitted on the L1/L2 control channel corresponding to the shared data channel)

As described above, the base station uses fixed resource blocks for the BCH. However, resource blocks may not be statically allocated, but may be dynamically allocated to the BCH. When resource blocks are dynamically allocated, allocation information indicating radio resources for the BCH is transmitted on the L1/L2 control channel corresponding to the BCH.

When resource blocks are dynamically allocated to the BCH, the base station may first allocate radio resources to the shared data channel, and then may allocate the remaining radio resources to the BCH. Since the BCH are received by mobile stations within the whole cell area, scheduling or allocating suitable resource blocks to the BCH is less needed. Therefore, any radio resource may be allocated to the BCH.

Particularly when multiple resource blocks are allocated to the BCH, it is preferable that resource blocks spaced in the frequency direction should be allocated to the BCH, in order to achieve a frequency diversity effect. For this reason, the base station may first allocate radio resources to the BCH, and then may allocate the remaining radio resources to the shared data channel. Alternatively, the base station may first allocate radio resources to the shared data channel with some restrictions so as to achieve a desired frequency diversity effect, and then may allocate the remaining radio resources to the BCH.

The base station transmits user IDs for the allocated radio resources, as shared control information included in the L1/L2 control channel corresponding to the shared data channel. When radio resources are dynamically allocated to the BCH, the base station may determine an unassigned user ID (for example, #0) for the BCH in advance. The use of the unassigned user ID allows for a common format between information included in the L1/L2 control channel corresponding to the BCH and shared control information included in the typical L1/L2 control channel.

(3) Part of L3 control information transmitted on the BCH

Transmitting L3 control information on the L1/L2 control channel can substantially increase the field of the BCH.

As described above, BCH control information transmitted on the L1/L2 control channel includes (1) the update flag, (2) allocation information, or (3) L3 control information. It should be noted that the combination of (1)-(3) may be used for the BCH control information.

The base station may transmit nothing on the L1/L2 control channel corresponding to the BCH, instead of transmitting the aforementioned (1)-(3). For example, the base station may suspend radio waves for the L1/L2 control channel corresponding to the BCH. Suspending radio waves can decrease control channel power and reduce interference with other cells.

[Structure of Base Station]

Figure 5:
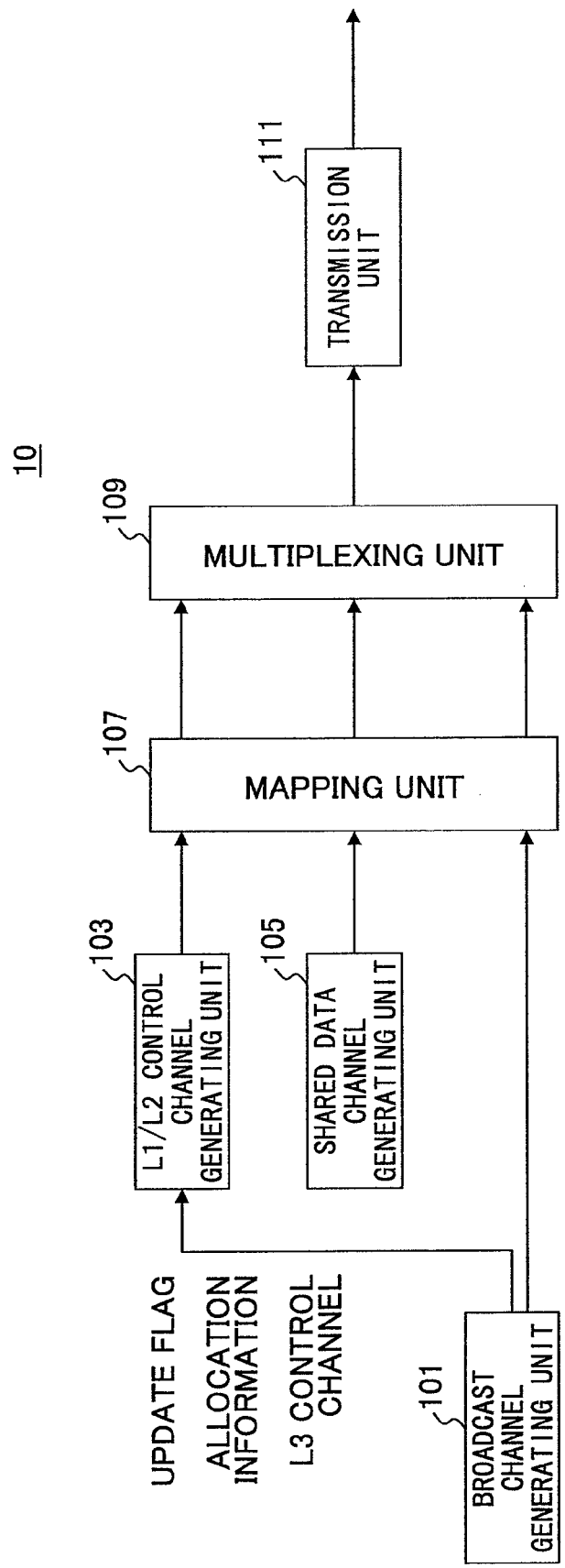
FIG. 5 shows a base station in accordance with an embodiment of the present invention.

FIG. 5 shows a structure of a base station 10 in accordance with an embodiment of the present invention. The base station 10 includes a broadcast channel generating unit 101, an L1/L2 control channel generating unit 103, a shared data channel generating unit 105, a mapping unit 107, a multiplexing unit 109, and a transmission unit 111.

The broadcast channel generating unit 101 generates a broadcast channel and supplies broadcast channel control information (an update flag indicating whether information on the broadcast channel is modified, broadcast channel allocation information, or L3 control information for the broadcast channel) to the L1/L2 control channel generating unit 103. The L1/L2 control channel generating unit 103 generates an L1/L2 control channel corresponding to the broadcast channel using the broadcast channel control information and generates an L1/L2 control channel corresponding to the shared data channel.

The mapping unit 107 allocates (maps) radio resources to the broadcast channel generated by the broadcast channel generating unit 101, to the L1/L2 control channel generated by the L1/L2 control channel generating unit 103, and to a shared data channel generated by the shared data channel generating unit 105. The mapping unit 107 may first (preferentially) allocate radio resources to the shared data channel. Alternatively, the mapping unit 107 may first (preferentially) allocate radio resources to the broadcast channel, in order to achieve a diversity effect on the broadcast channel.

The multiplexing unit 109 multiplexes the broadcast channel, the L1/L2 control channel, and the shared data channel into a subframe. The transmission unit 111 transmits a radio frame to the mobile station.

Figure 6:
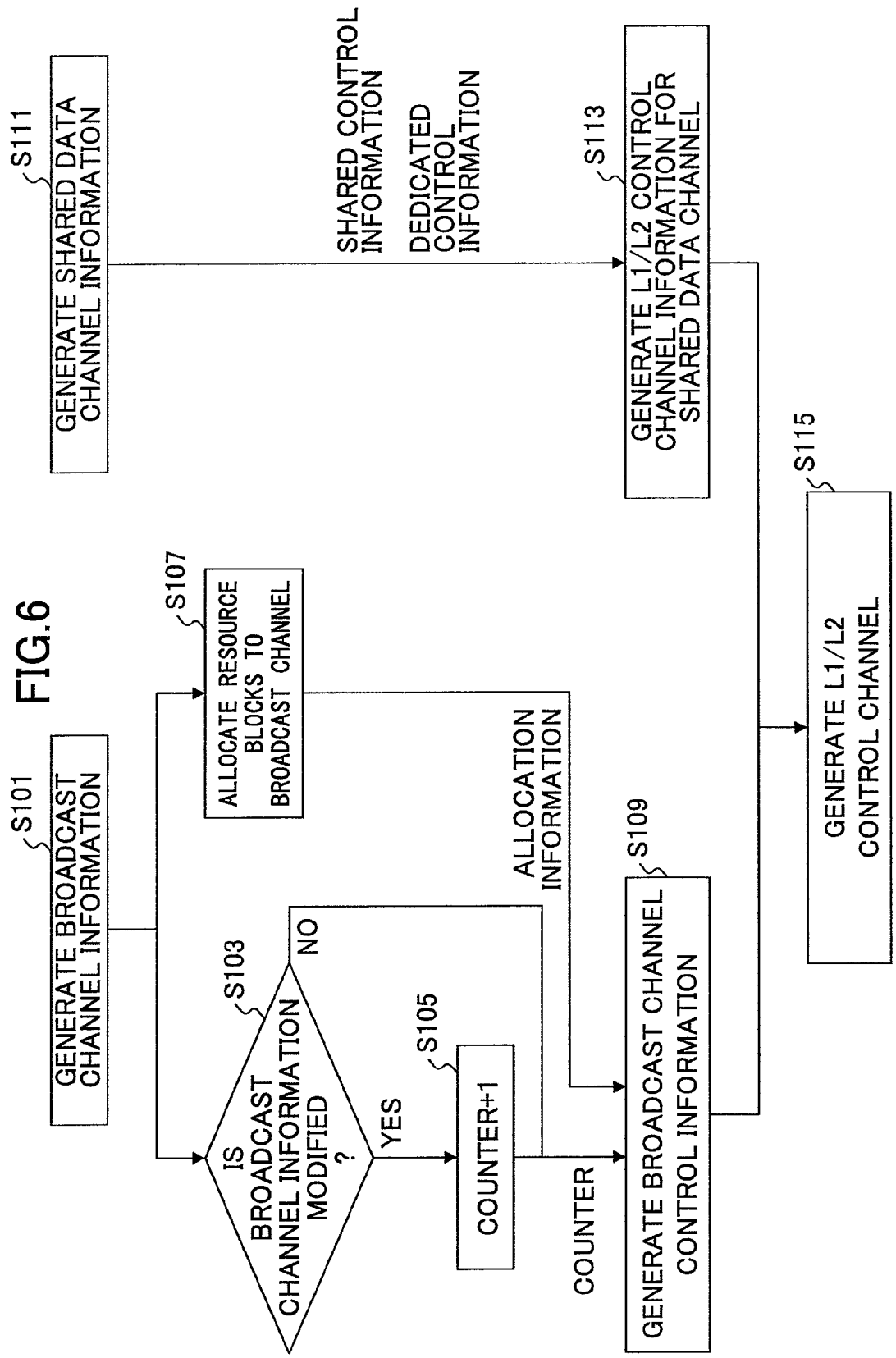
FIG. 6 shows a flowchart for generating a L1/L2 control channel in accordance with an embodiment of the present invention.

With reference to FIG. 6, a method is described below in which the base station 10 generates the update flag and the allocation information as broadcast channel control information transmitted on the L1/L2 control channel. First, the broadcast channel generating unit 101 generates a broadcast channel (S101). If broadcast channel information is modified (S103), a counter as the update flag is incremented (S105). Otherwise, the counter is not incremented. Meanwhile, the mapping unit 107 allocates resource blocks to the broadcast channel (S107). The base station generates broadcast channel control information using the counter and the allocation information (S109). Meanwhile, the shared data channel generating unit 105 generates a shared data channel (S111). The L1/L2 control channel generating unit 103 generates shared control information and dedicated control information as L1/L2 control channel information for the shared data channel (S113). The L1/L2 control channel generating unit 103 combines the broadcast channel control information and the L1/L2 control channel information for the shared data channel to generate an L1/L2 control channel (S115).

[Structure of Mobile Station]

Figure 7:
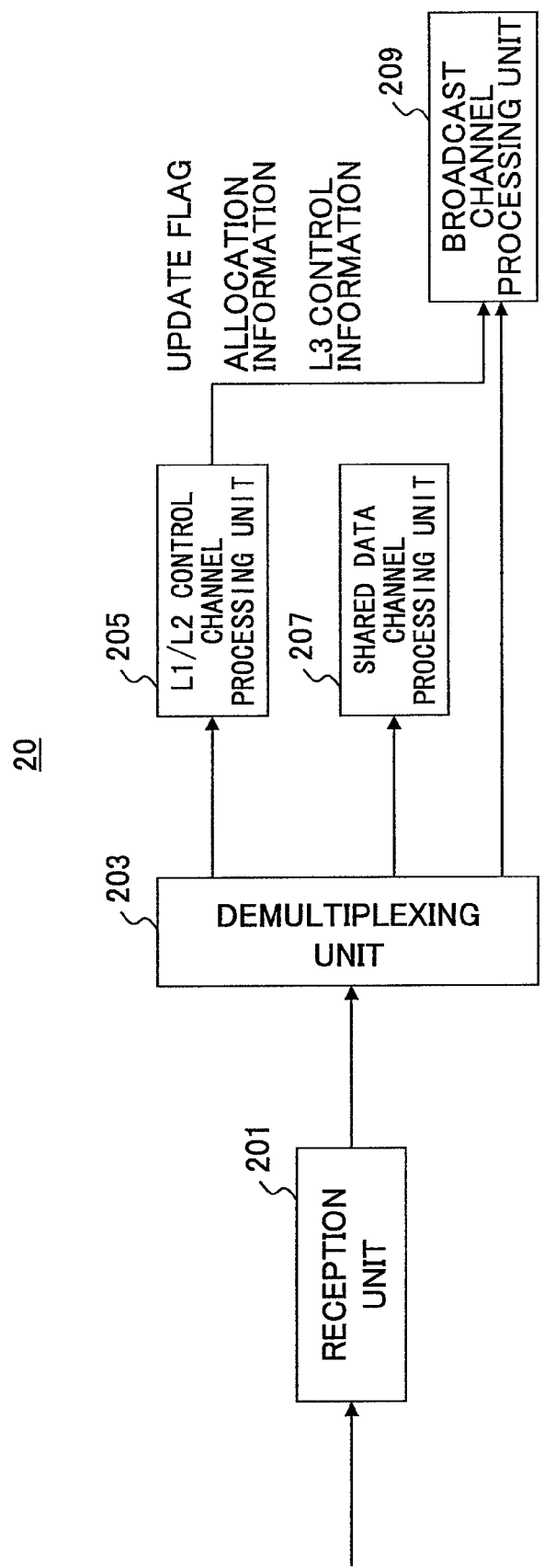
FIG. 7 shows a mobile station in accordance with an embodiment of the present invention.

FIG. 7 shows a structure of a mobile station 20 in accordance with an embodiment of the present invention. The mobile station 20 includes a reception unit 201, a demultiplexing unit 203, an L1/L2 control channel processing unit 205, a shared data channel processing unit 207, and a broadcast channel processing unit 209.

The demultiplexing unit 203 demultiplexes a radio frame received by the reception unit 201 into an L1/L2 control channel, a shared data channel, and a broadcast channel. The L1/L2 control channel processing unit 205 extracts an update flag, allocation information, or L3 control information from the L1/L2 control channel. The broadcast channel processing unit 209 processes the broadcast channel based on them. The shared data channel processing unit 207 checks the L1/L2 control channel for the shared data channel and processes data transmitted to the mobile station 20.

Figure 8:
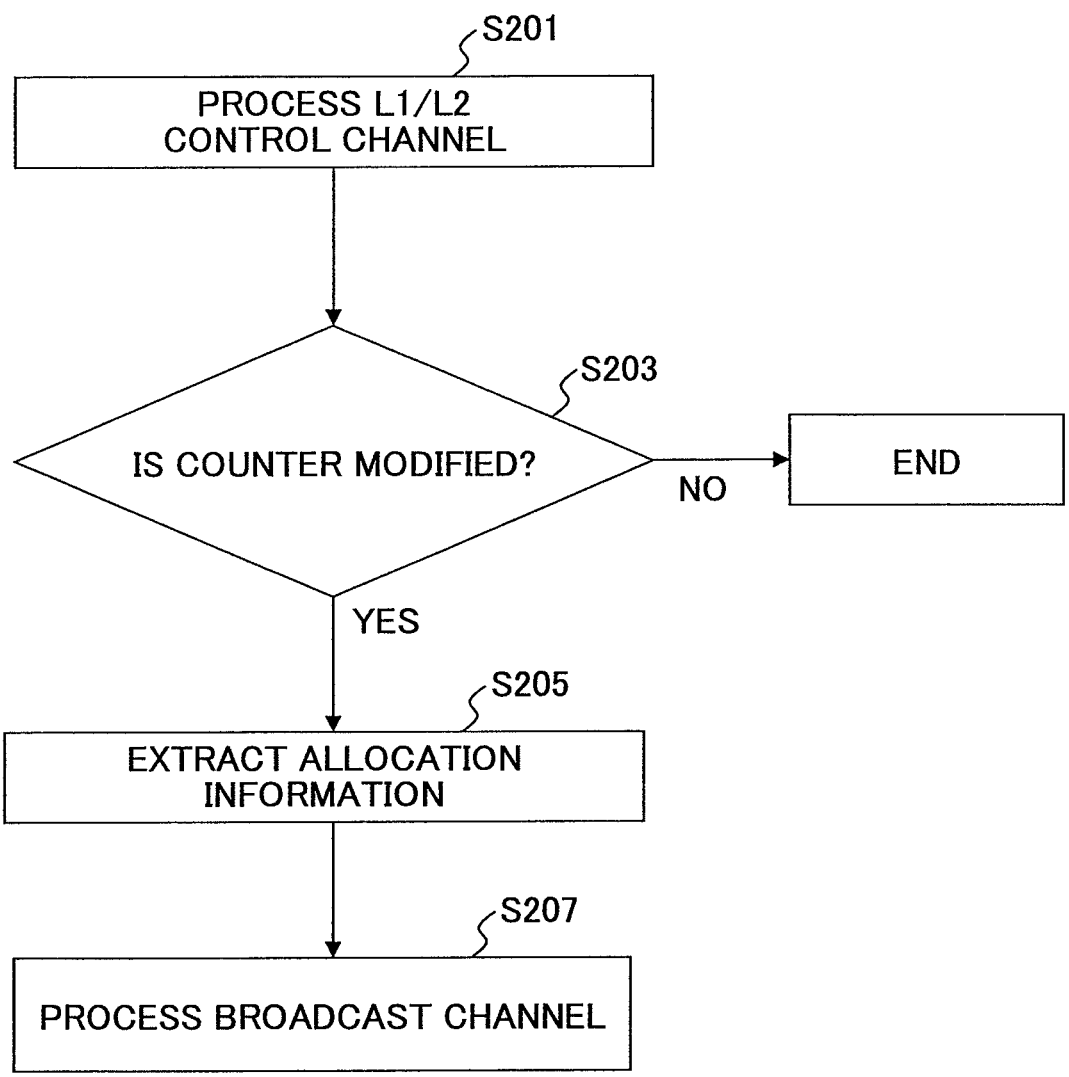
FIG. 8 shows a flowchart for processing a broadcast channel in accordance with an embodiment of the present invention.

With reference to FIG. 8, a method is described below in which the mobile station 20 receives the update flag and the allocation information as broadcast channel control information on the L1/L2 control channel and processes the broadcast channel. First, the mobile station 20 finds the L1/L2 control channel (S201), and checks whether the counter as the update flag is modified (S203). If the counter is not modified, the mobile station 20 need not process the broadcast channel and terminates the method. Otherwise, the mobile station 20 extracts allocation information from the L1/L2 control channel (S205). The mobile station 20 extracts and processes the broadcast channel from the radio frame based on the allocation information (S207).

Figure 9:
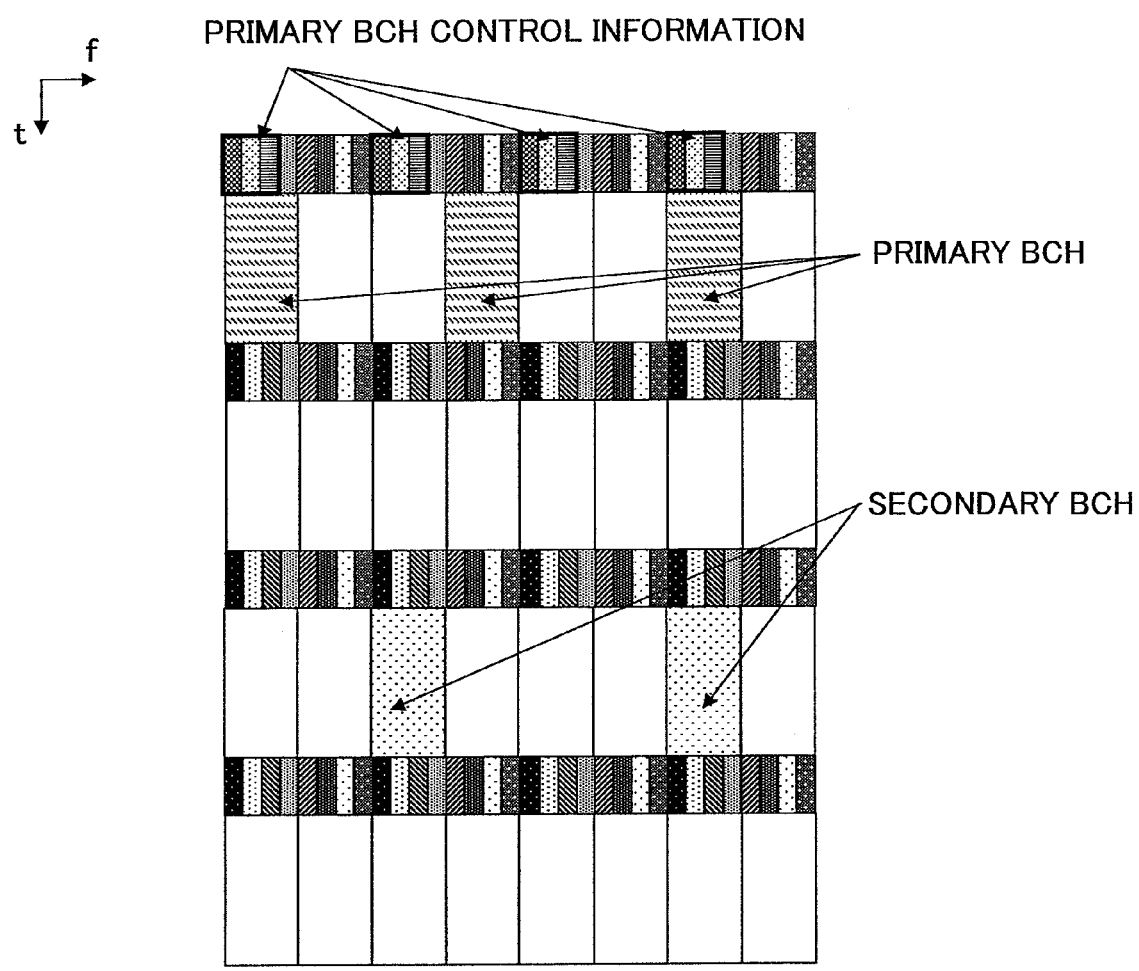
FIG. 9 shows a radio frame including both a primary BCH and a secondary BCH.

The aforementioned embodiment is also applicable to the case where both a primary BCH and a secondary BCH are used. As shown in FIG. 9, three resource blocks are allocated to the primary BCH. Accordingly, the L1/L2 control channel corresponding to the three resource blocks can be efficiently used for primary BCH control information. The primary BCH control information may include an update flag, allocation information, or L3 control information as described above.

According to an embodiment of the present invention, the L1/L2 control channel can be efficiently used when resource blocks are allocated to the broadcast channel.

This international patent application is based on Japanese Priority Application No. 2006-169444 filed on Jun. 19, 2006, the entire contents of which are incorporated herein by reference.

What is claimed is:

1. A base station for transmitting a radio frame where an L1/L2 control channel is multiplexed into a portion of a subframe to transmit data on a shared data channel, comprising:
    a broadcast channel generating unit configured to generate a channel on which information to be broadcast is placed;
    an L1/L2 control channel generating unit configured to generate, as the L1/L2 control channel corresponding to the channel on which information to be broadcast is placed, control information that is allocation information about the channel on which the information to be broadcast is placed;
    a multiplexing unit configured to multiplex the channel on which information to be broadcast is placed, the shared data channel, and the L1/L2 control channel into the subframe; and
    a mapping unit configured to perform allocation of the channel on which the information to be broadcast is placed with spacing in a frequency direction;
    wherein the mapping unit performs allocation of the channel on which the information to be broadcast is placed using a resource block on which the shared data channel is not placed.

2. The base station as claimed in claim 1, further comprising:
    a shared data channel generating unit configured to generate the shared data channel,
    wherein the L1/L2 control channel generating unit also generates the L1/L2 control channel corresponding to the shared data channel.

3. A mobile station for receiving a radio frame where an L1/L2 control channel is multiplexed into a portion of a subframe to receive data on a shared data channel, comprising:
- a demultiplexing unit configured to demultiplex the radio frame into the L1/L2 control channel, the shared data channel, and a channel on which information to be broadcast is placed;
- an L1/L2 control channel processing unit configured to extract allocation information about the channel on which the information to be broadcast is placed by referring to the L1/L2 control channel; and
- a broadcast channel processing unit configured to extract and process the channel on which information to be broadcast is placed from the radio frame based on a content of the allocation information about the channel on which the information to be broadcast is placed,
- wherein allocation of the channel on which the information to be broadcast is performed with spacing in a frequency direction, and
- wherein allocation of the channel on which the information to be broadcast is placed is performed using a resource block on which the shared data channel is not placed.

4. The mobile station as claimed in claim 3,
- wherein the L1/L2 control channel processing unit also extracts information about the shared data channel by referring to the L1/L2 control channel, and
- wherein the mobile station further comprises a shared data channel processing unit configured to process the shared data channel destined for the mobile station based on the information about the shared data channel.

5. A communication method in which a base station transmits a radio frame where an L1/L2 control channel is multiplexed into a portion of a subframe to transmit data on a shared data channel; comprising the steps of:
- generating a channel on which information to be broadcast is placed;
- generating, as the L1/L2 control channel corresponding to the channel on which information to be broadcast is placed, control information that is allocation information about the channel on which the information to be broadcast is placed;
- multiplexing the channel on which the information to be broadcast is placed, the shared data channel, and the L1/L2 control channel into the subframe; and
- performing allocation of the channel on which the information to be broadcast is placed with spacing in a frequency direction;
- wherein the performing step comprises performing allocation of the channel on which the information to be broadcast is placed using a resource block on which the shared data channel is not placed.

6. The communication as claimed in claim 5, further comprising the step of:
- generating the shared data channel;
  - wherein the step of generating, as the L1/L2 control channel, the control information comprises also generating the L1/L2 control channel corresponding to the shared data channel.

* * * * *